United States Patent [19]

Kubota

[11] Patent Number: 5,386,220

[45] Date of Patent: Jan. 31, 1995

[54] DIGITAL DISPLAY VALUE ADJUSTING DEVICE

[75] Inventor: Maki Kubota, Tokyo, Japan

[73] Assignee: Seikosha Co., Ltd., Japan

[21] Appl. No.: 977,130

[22] Filed: Nov. 16, 1992

[30] Foreign Application Priority Data

Nov. 15, 1991 [JP] Japan ................................ 3-300050

[51] Int. Cl.$^6$ ............................................ G09G 5/00
[52] U.S. Cl. .................................................. 345/184
[58] Field of Search ................... 345/156, 184; 341/35

[56] References Cited

U.S. PATENT DOCUMENTS

| | | | |
|---|---|---|---|
| 3,319,227 | 5/1967 | Evans, Jr. ........................... | 345/184 |
| 4,171,540 | 10/1979 | Arnold ................................ | 345/168 |
| 4,549,173 | 10/1985 | Nakamura .......................... | 345/184 |
| 4,568,927 | 2/1986 | Fowler ............................... | 345/184 |

Primary Examiner—Jeffery Brier
Attorney, Agent, or Firm—Bruce L. Adams; Van C. Wilks

[57] ABSTRACT

A digital display value adjusting device reliably determines the direction of rotation of a manual input member through a simple calculation for adjusting a digital display value. A plurality of pulse strings are generated by a pulse generator in accordance with the rotation of the manual input member. Pulse state data are generated and temporarily stored for each of the pulse strings. Through a calculation, the change in the state of the pulses is determined using the currently generated pulse state data and the stored pulse state data. The direction of rotation of the input member is determined on the basis of the result of the calculation. The direction of rotation of the input member is determined only when a change in state of a first generated pulse string is successively followed by a change in state of another generated pulse string before another change in state of the first generated pulse string occurs. The value of a digital display is adjusted in accordance with the detection results only when a change of state occurs successively in the generated pulse strings.

19 Claims, 4 Drawing Sheets

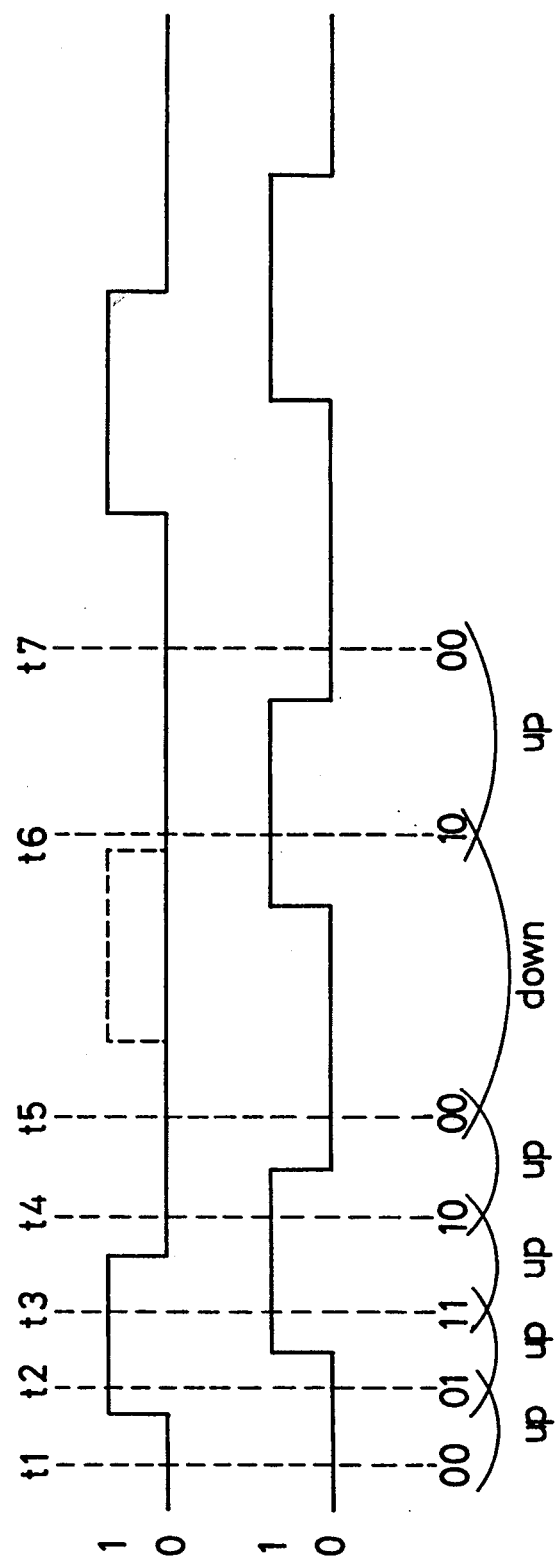

DIGITAL DISPLAY VALUE ADJUSTING DEVICE

BACKGROUND OF THE INVENTION

The present invention relates generally to a rotation detection device such as that used by a digital display value adjusting device. In particular, the present invention relates to a pulse generator of a rotation detection device of a digital display value adjusting device.

In a conventional digital display value adjusting device, such as that disclosed in Japanese Patent Publication No. 60-26477, a manual input device (such as a manually rotatable stem) of a pulse generator is rotated to generate at least two pulse strings which are timewise shifted but overlap each other. Pulse information is output by the pulse generator when there is a change in the pulse strings. A bit word of 4-bits indicating the change in the state of a pulse is obtained based on the current pulse information and the pulse information which has been output from the pulse generator prior to the current pulse information. The direction of rotation of the manual input device is determined by detecting the coincidence between the bit word and a bit word stored in advance in a fixed storage device. A digital display value is adjusted on the basis of the result of the determination.

For example, if current pulse information "00" is generated from the pulse generator and the previous pulse information is "10" the bit word will be "0010". The bit word "0010" is stored in the fixed storage device as clockwise pulse information which undergoes coincidence detection, and it is thus determined that the manual input device has been rotated in a clockwise direction. As described above, pulse information indicating the direction of rotation is stored in advance in the fixed storage device. When the pulse generator generates pulse information which coincides with the stored pulse information, the direction of rotation of the manual input device is ascertained.

A conventional pulse generator utilizing a manual input device, such as a rotary stem, may malfunction, as shown in FIG. 4 for example, when a pulse in one string is missed and is not generated because the rotation of the manual input device is unintentionally momentarily interrupted or changed. If it is assumed that the changes in the pulses at times t1 to t5 in FIG. 4 represent correct operating conditions in the case wherein the manual input device is rotated clockwise, the conventional pulse generator has stored in advance in its fixed storage device "0001", "1011", "1110" and "1000" as clockwise or up bit words, and "0010" "1011" "1101" and. "0100" as counterclockwise or down bit words. Therefore, the rotation is determined to be clockwise at times t1 to t5.

However, if for some reason one of the pulses (indicated by broken lines) is not generated, pulse information "10" generated at time t6 will result in a bit word "0010" which is determined to be a counterclockwise direction. Therefore, when this occurs, even though the manual input device continues to be rotated in the clockwise direction, the pulse generator may output a bit word that determines the rotation to be in the opposite, or counterclockwise, direction.

Further, in accordance with the conventional pulse generator, it takes time to obtain the bit word based on the current pulse information and the next previous pulse information. In addition, a fixed storage device is required for storing in advance the bit words to be checked for coincidence with the bit word thus obtained. This results in an increase in the size of the circuit, thus increasing the cost of the device.

SUMMARY OF THE INVENTION

It is an object of the present invention to provide a rotation detection device which reliably determines the direction of rotation of a manual input device using simple computations.

Another object of the present invention is to provide a digital display value adjusting device which correctly adjusts digital display values.

In accordance with the present invention, the drawbacks of the conventional art are alleviated. In accordance with the present invention, display means displays a digital value. Pulse generating means generates at least two partially overlapping pulse strings whose generation order is varied depending on the direction of rotation of a manual input device. Data output means generates current pulse state data which indicates the current state of each of the pulse strings from the pulse generating means. Storage means stores the current pulse state data received from the data output means as prior pulse state data. Calculating means determines the change in state of each of the pulse strings when the current pulse state data is generated by the data output means. The calculating means calculates the change in state using the current pulse state data and the prior pulse state data stored in the storage means. Rotation detecting means detects the direction of rotation of the manual input device on the basis of the change in state determined by the calculating means, and adjusting means adjusts the digital value displayed by the display means in accordance with the direction of rotation detected by the rotation detecting means.

BRIEF DESCRIPTION OF THE DRAWINGS

FIG. 4 is an explanatory diagram for explaining the operation of a conventional device.

DETAILED DESCRIPTION OF THE INVENTION

An embodiment of the present invention wherein a device according to the present invention is used in a digital clock will now be described with reference to the drawings.

Figure 1:
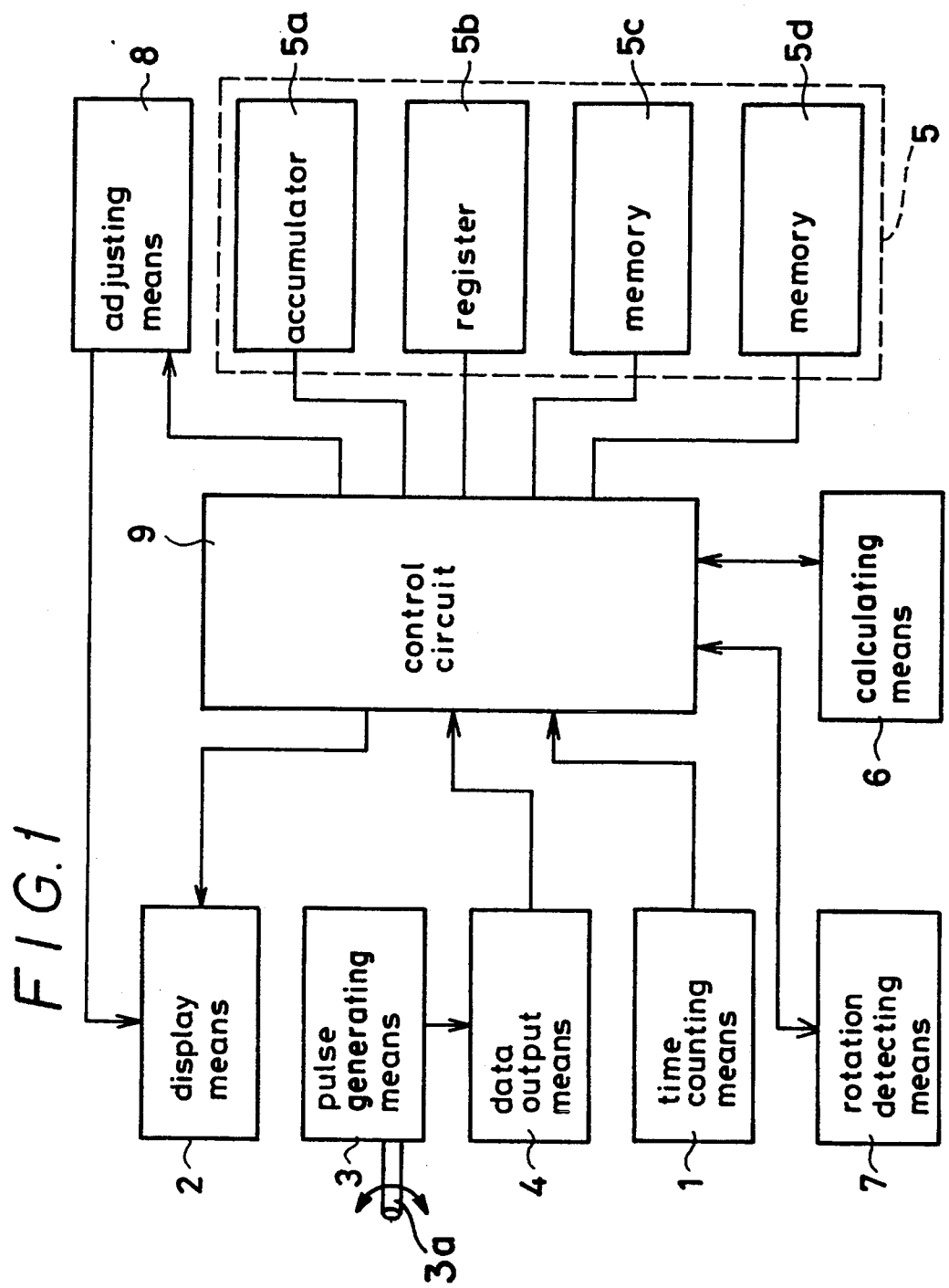
FIG. 1 is a block diagram showing an embodiment of the present invention.
Figure 3:
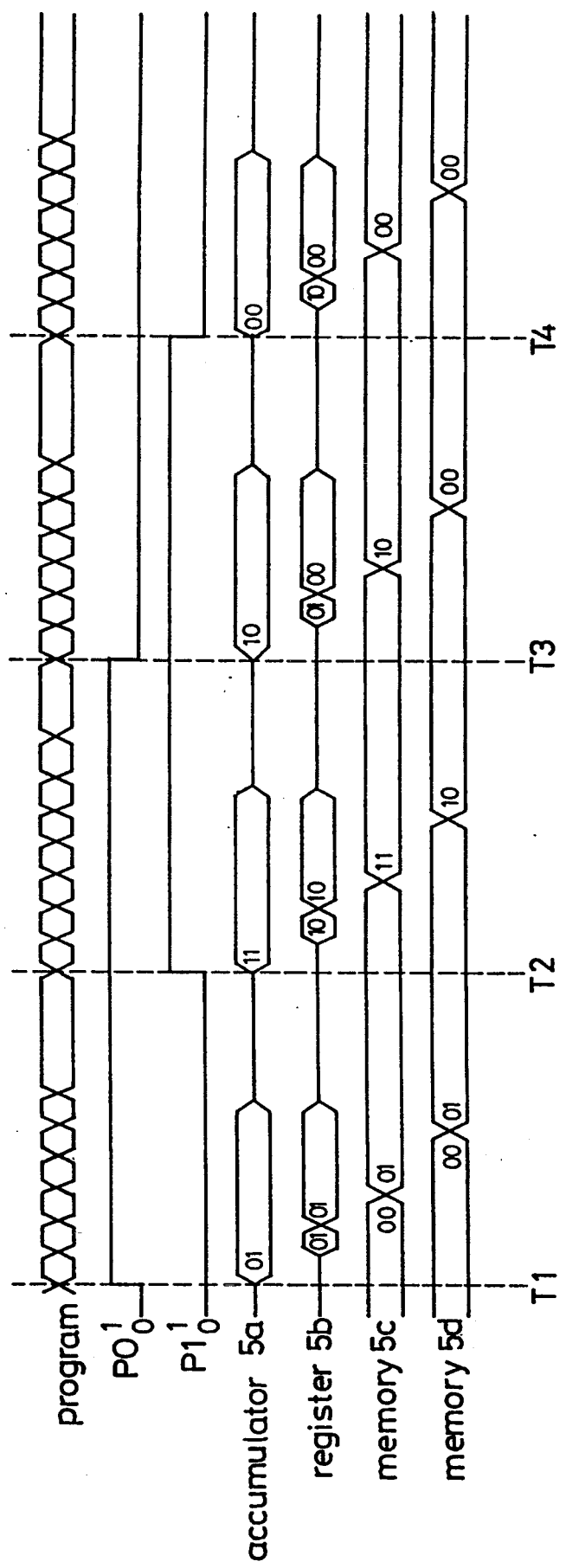
FIG. 3 is an explanatory timing diagram for explaining the operation of the embodiment shown in FIG. 1.

Referring to FIG. 1, time counting means 1 counts a current time. Display means 2 displays in digital form the time counted by the time counting means 1 using a digital value. Pulse generating means 3 generates two pulse strings P0 and P1 whose generation order is varied depending on the direction of rotation of a manual input device, such as a rotary stem 3a. As shown in FIG. 3, the two pulse strings P0 and P1 partially overlap. Data output means 4 outputs pulse state data when a change occurs in the state of each of the pulse strings received from the pulse generating means 3.

Storage means 5 stores the current pulse state data received from the data output means 4 as prior pulse state data. The storage means comprises an accumulator 5a, a register 5b, a memory 5c and a memory 5d. Calculating means 6 performs a calculation when the current pulse state data is generated from the data output means 4. The calculation is performed using the current pulse state data and prior pulse state data which is stored in the storage means 5 to determine the change in the state of the pulse. Rotation detecting means 7 detects the direction of rotation of the manual input device on the basis of the calculated change in state determined by the calculating means 6. Adjusting means 8 adjusts the digital value displayed by the display means 2 in accordance with the direction of rotation determined by the rotation detecting means 7. A control circuit 9 controls the operation of the device as a whole.

Figure 2:
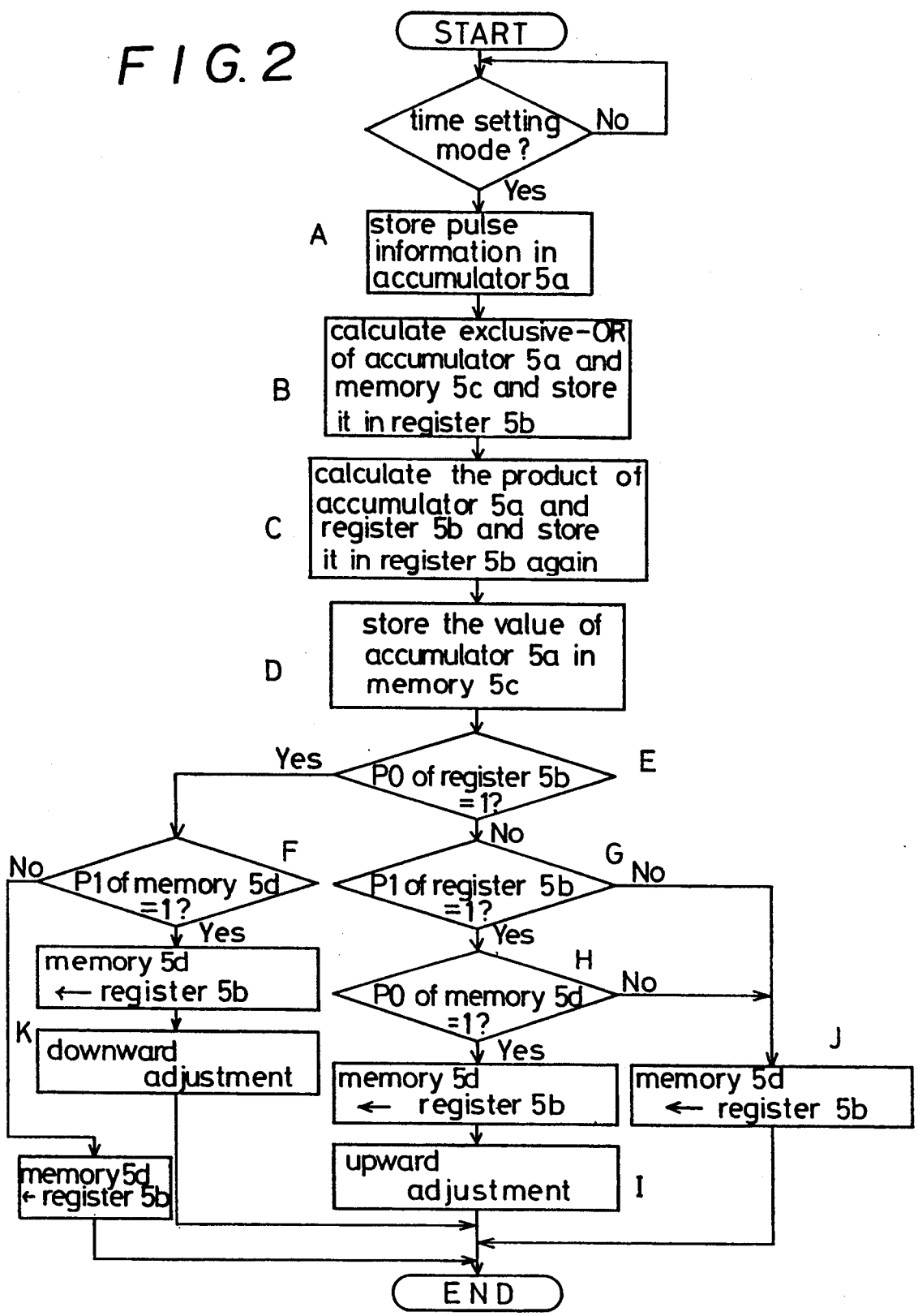
FIG. 2 is a flow chart used for explaining the operation of the embodiment shown in FIG. 1.

The operation of digital display value adjustment in accordance with the present invention will now be described according to the flow chart FIG. 2 and the timing diagram of FIG. 3.

A mode select switch (not shown) is first operated to select a time setting mode. At this time, the data in the memories 5c and 5d are reset to "00". In this example, when the manually rotatable stem 3a is rotated clockwise, the pulse generating means 3 generates two pulse strings P0 and P1 whose generation order is varied and which partially overlap as shown in FIG. 3.

Assume that the pulse P0 rises at timing T1 to establish a state "1" as shown in FIG. 3. At this time, pulse information "01" indicating the state of each pulse is generated by the data output means 4 and stored in the accumulator 5a (step A). The pulse information from the data output means 4 comprises two bits. The first bit represents the state of the pulse P1 and second bit represents the state of the pulse P0. A bit value of "1" indicates the rise of a pulse, and a bit value of "0" indicates the fall of a pulse.

Next, the calculating means 6 calculates the exclusive-OR "01" from the data "01" stored in the accumulator 5a and the data "00" stored in the memory 5c, and this value "01" is stored in the register 5b (step B). The value of the exclusive-OR indicates which of the pulses P0 or P1 has changed.

Then, the calculating means 6 calculates the product "01" of the data "01" stored in the register 5b and the data "01" stored in the accumulator 5a, and this value "01" is stored in the register 5b (step C). The value of the product indicates which of the pulses P0 or P1 has risen.

Next, the data "01" stored in the accumulator 5a is stored in the memory 5c (step D).

Next, the direction of rotation of the manual input device 3a is detected by the rotation detecting means 7 depending on the data "01" stored in the register 5b and the data "00" stored in the memory 5d (i.e., the calculated change in state). The data stored in the memory 5d is the pulse information, i.e., the change in state of the pulse generated from the data output means 4 at the time of the next previous change in the pulses and indicates which of the pulses P0 or P1 has risen. The determination operation is initiated by determining whether the data stored in the register 5b indicates a rise of the pulse P0 from the current change in the pulse. Since, in this example, the data stored in the register 5b is "01", it is determined that the pulse P0 has risen.

Then, it is determined whether the data stored in the memory 5d indicates a rise of the pulse P1 (step F). In other words, it is determined whether the pulse P1 has risen or not from the previous change in the pulse. Since the data stored in the register 5d is "00" it is determined that the pulse P1 has not risen in the previous change in state of the pulse.

As a result of the determination, it is detected that the pulse P1 was in a "0" state in the previous change in state of the pulse, while the pulse P0 has risen in the current change in state of the pulse. In this case, the direction of rotation of the manual input device 3a is not identified. The data in the register 5b is then stored in the memory 5d and the rotation detecting operation is terminated (step G).

Next, when the pulse P1 rises at timing T2 in FIG. 3, pulse information "11" is generated by the data output means 4 and stored in the accumulator 5a. Then, the calculating means 6 calculates the exclusive-OR "10" from the data "11" in the accumulator 5a and the data "01" in the memory 5c, and this value "10" is stored in the register 5b.

Next, the calculating means 6 calculates the product "10" of the data "11" in the accumulator 5a and the data "10" in the register 5b, and this value "10" is stored in the register 5b. The data "11" in the accumulator 5a is then stored in the memory 5c.

Next, the rotation detecting means 7 determines the direction of rotation of the manual input device 3a on the basis of the data "10" stored in the register 5b and the data "01" stored in the memory 5d (i.e., the calculated change in state).

First, it is determined at step E that the data in the register 5b is not indicative of the rise of the pulse P0.

Then, it is determined whether the data in the register 5b is indicative of the rise of the pulse P1 (step G). Since the data in the register 5b is "10" it is determined that it is indicative of the rise of the pulse P1.

It is then determined whether the data in the memory 5d is indicative of the rise of the pulse P0 (step H). Since the data in the memory 5d is "01" it is determined that it is indicative of the rise of the pulse P0.

As a result of the above determination, it is determined that the pulse P0 has risen in the previous change in state of the pulse while the pulse P1 has risen in the current change in state of the pulse. In this case, after the data "10" in the register 5b is subsequently stored in the memory 5d, a clockwise adjusting signal is generated from the control circuit and applied to the adjusting means 8 to adjust the digital value displayed by the display means 2 upward (step I). In other words, in this example the digital value is incremented.

Next, when the pulse P0 falls at timing T3 in FIG. 3, pulse information "10" is generated by the data output means 4 and stored in the accumulator 5a. Then, the calculating means 6 calculates the exclusive-OR "01" from the data "10" in the accumulator 5a and the data "11" in the memory 5c, and this value "01" is stored in the register 5b. Next, the calculating means 6 calculates the product "00" of the data "10" in the accumulator 5a and the data "01" in the register 5b, and this value "00" is stored in the register 5b. The data "10" in the accumulator 5a is then stored in the memory 5c.

Next, the rotation detecting means 7 detects the direction of rotation of the manual input device 3a on the basis of the data "00" in the register 5b and the data "10" in the memory 5d (i.e., the calculated change in state).

First, it is determined at step E that the data in the register 5b is not indicative of the rise of the pulse P0. It is then determined whether the data in the register 5b is indicative of the rise of the pulse P1 at step G. Since the data in the register 5b is "00" it is determined that it is not indicative of the rise of the pulse P1. In this case, since no rise has been detected of either pulse P1 and pulse P0, the direction of rotation of the manual input device is not identified. The data "00" in the register 5b is stored in the memory 5d and the rotation detecting operation is terminated (step J).

Next, when the pulse P1 falls at timing T4 in FIG. 3, the same routine as in the case of the change in the pulse at the timing T3 is repeated. The direction of rotation of the operating member is not identified.

If it is determined at step F that the data in the memory 5d is indicative of the rise of the pulse P1, i.e., if it is detected that the pulses P1 and P0 have successively risen in this order, the data "10" in the register 5b is stored in the memory 5d and, thereafter, a downward (counterclockwise) adjusting signal is generated from the control circuit 9 and applied to the adjusting means 8 to adjust the digital value displayed by the display means 2 downward (step K).

If it is determined at step H that the data in the memory 5d is not indicative of the rise of the pulse P0, i.e., if the pulse P0 has not risen in the previous change in state of the pulse while the pulse P1 has risen in the current change in state of the pulse, the direction of rotation of the manual input device 3a is not identified. The data in the register 5b is stored in the memory 5d at step J and the rotation detecting operation is terminated.

In accordance with the present invention, as described above, it is determined that the manual input member 3a has been rotated clockwise when the pulse P0 and the pulse P1 have successively risen in that order, and that the manual input member 3a has been rotated counterclockwise when the pulse P1 and the pulse P0 have successively risen in that order. By this determination, rotation is detected and the digital display value is adjusted.

Although the invention has been applied to the digital display value of a clock in the above embodiment, the present invention is applicable to other devices where adjustment of a digital display is performed. Also, the rotation detecting device of the invention is applicable to other devices where detection of the direction of a rotational input device is desired.

In accordance with the present invention, the direction of rotation of a manual input device 3a is identified only when pulses successively rise. This eliminates the conventionally experienced malfunction, such as when a missing pulse causes an incorrect determination of the direction of rotation of the manual input device. Thus, the present invention allows reliable adjustment of a digital display value in accordance with the rotation of the manual input device 3a.

Further, since the direction of rotation of the manual input device 3a is identified through a simple calculation, there is no need for storing pulse information in advance, thus the construction of the device is simplified and cost reduction can be achieved.

I claim:

1. A digital value adjusting device, comprising: display means for displaying a digital value; pulse generating means including a rotatable input member for generating at least two partially overlapping pulse strings having a generation order varied depending on a direction of rotation of the input member; data output means for generating and outputting current pulse state data indicative of a state of each of the pulse strings; storing means for storing the current pulse state data from the data output means as prior pulse state data; calculating means for calculating a change in state of each of the pulse strings when the current pulse data is generated by the the data output means, the change in state being calculated from the current pulse state data and the prior pulse state data stored in the storing means; rotation detecting means for detecting the direction of rotation of the input member on the basis of the change in state calculated by the calculating means, the direction of the input member being detected only when a change in state of one of the pulse strings is successively followed by a change in state of another of the pulse strings before another change in state of said one of the pulse strings occurs; and adjusting means for adjusting the digital display value displayed by the display means in accordance with the direction of rotation detected by the rotation detecting means so that the digital display value is adjusted only when a change of state occurs successively in the at least two partially overlapping pulse strings.

2. A digital display value adjusting device according to claim 1; further comprising time counting means for counting a current time.

3. A digital display value adjusting device according to claim 2; wherein the current pulse state data and the prior pulse state data comprise binary information.

4. A digital display value adjusting device according to claim 3; wherein the binary information comprises a binary digit corresponding to each one of the pulse strings.

5. A digital display adjusting device according to claim 1; wherein the storing means comprises an accumulator, a register, a first memory device and a second memory device.

6. A digital display adjusting device according to claim 5; wherein the calculating means includes means for calculating the change in state by exclusive-OR processing between the current pulse state data generated by the data output means and stored in the accumulator and the prior pulse state data stored in the first memory device.

7. A digital display adjusting device according to claim 5; wherein the calculating means includes means for calculating the change in state depending on a product of data stored in the register and data stored in the accumulator.

8. A digital display adjusting device according to claim 1; wherein the input member comprises a manually rotatable stem.

9. A rotation detecting device, comprising: pulse generating means including a rotary input member for generating at least two partially overlapping pulse strings having a generation order varied depending on a direction of rotation of the input member; data output means receptive of the pulse strings for generating current pulse state data indicative of a state of each of the pulse strings; storing means receptive of the current pulse state data for storing the same as prior pulse state data; calculating means receptive of the current pulse state data from the data output means and the prior pulse state data from the storing means for calculating a change in state of each of the pulse strings dependent on the current pulse state data and the prior pulse state data; and rotation detecting means for detecting a direction of rotation of the input member based on the calculated change in state calculated by the calculating means, the direction of rotation of the input member being detected only when a change in state of one of the pulse strings is successively followed by a change in state of another of the pulse strings before another change in state of said one of the pulse strings occurs.

10. A rotation detecting device according to claim 9 including time counting means for counting a current time.

11. A rotation detecting device according to claim 10; including digital display means for displaying a digital value; and adjusting means for adjusting the digital value displayed by the display means in accordance with the direction of rotation detected by the rotation detecting means so that the digital value is adjusted only when a change of state occurs successively in the at least two partially overlapping pulse strings.

12. A rotation detecting device according to claim 11; wherein the rotatable input member comprises a manually rotatable input member.

13. A rotation detecting device according to claim 9; wherein the current pulse state data comprises binary information.

14. A rotation detecting device according to claim 13; wherein the binary information comprises a binary digit corresponding to each one of the pulse strings.

15. A rotation detecting device according to claim 9; wherein the storing means comprises an accumulator, a register, a first memory device and a second memory device.

16. A rotation detecting device according to claim 15; wherein the calculating means includes means for calculating the change in state by exclusive-OR processing between the prior pulse state data stored in the first memory device and the current pulse state data stored in the accumulator and depending on a product of an exclusive-OR processing result stored in the register and the current pulse state data stored in the accumulator.

17. A digital display value adjusting device, comprising: display means for displaying a digital value; pulse generating means including a rotatable input member for generating at least two partially overlapping pulse strings having a generation order varied depending on a direction of rotation of the input member; data output means for generating and outputting current pulse state data indicative of a state of each of the pulse strings; determining means for determining a change of state of each of the pulse strings depending on the current pulse state data from the data output means and prior pulse state data generated by the data output means; storing means for storing the prior pulse state data generated by the data output means and for storing a previously determined change of state of each of the pulse strings determined by the determining means; rotation detecting means for detecting the direction of rotation of the input member depending on a current change of state of each of the pulse strings determined by the determining means and the stored previously determined change of state of each of the pulse strings stored in the storing means, the direction of the input member being detected only when a change in state of one of the pulse strings is successively followed by a change in state of another of the pulse strings before another change in state of said one of the pulse strings occurs; and adjusting means for adjusting the display value displayed by the display means in accordance with the direction of rotation detected by the rotation detecting means.

18. A digital display value adjusting device according to claim 17; wherein the determining means includes means for generating a calculated value by exclusive-OR processing between the current pulse state data from the data output means and the prior pulse state data stored in the storing means to obtain a result, and means for generating a product value of the result and the current pulse state data from the data output means; and wherein the storing means includes means for storing the product value.

19. A digital display value adjusting device according to claim 18; wherein the rotation detecting means includes means for judging the direction of rotation of the input member when the product value represents a change in state of a first one of the pulse strings and the prior output from the determining means stored in the storing means represents a change in state of a second one of the pulse strings.

* * * * *